United States Patent [19]

Benton et al.

[11] Patent Number: 4,749,578

[45] Date of Patent: Jun. 7, 1988

[54] MOLASSES FEED BLOCK FOR ANIMALS AND METHOD OF MAKING THE SAME

[75] Inventors: Alfred E. Benton, Industry; John Patrick, Long Beach, both of Calif.

[73] Assignee: Benton Fee Yard, Inc., Walnut, Calif.

[21] Appl. No.: 801,246

[22] Filed: Nov. 25, 1985

[51] Int. Cl.$^4$ ................................................ A23K 1/02
[52] U.S. Cl. ...................... 426/74; 426/515; 426/520; 426/658; 426/807
[58] Field of Search ............... 426/515, 520, 658, 69, 426/74, 72, 623, 630, 635, 807; 127/29, 58–59

[56] References Cited

U.S. PATENT DOCUMENTS

| | | | |
|---|---|---|---|
| 3,961,081 | 6/1976 | McKenzie | 426/520 |
| 4,027,043 | 5/1977 | Schroeder et al. | 426/658 |
| 4,062,988 | 12/1977 | De Santis | 426/656 |
| 4,171,386 | 10/1979 | Skoch et al. | 426/630 |
| 4,431,675 | 2/1984 | Schroeder et al. | 426/623 |

OTHER PUBLICATIONS

Hawby, The Condensed Chemical Dictionary Van Nostrand Reinhold Co., (1982), p. 611.
"Technology of Manufacturing Feed Blocks Advances", *Feedstuffs*, Oct. 28, 1985, pp. 11–13, copy enclosed.

*Primary Examiner*—R. B. Penland
*Attorney, Agent, or Firm*—Christie, Parker & Hale

[57] ABSTRACT

An improved molasses feed block is provided that is water resistant, non-porous, hard and vitreous. Said feed block is generally manufactured by the following method. A fluid feed composition is provided comprising molasses, unsaturated free fatty acids and an amount of a bivalent base sufficient to saponify said fatty acids into an insoluble soap to enhance the water resistance of said feed block. Lecithin is also added to reduce the stickiness of said composition. A nutritionally compatible acid or base is added to maintain the pH of said composition between about 6.2 to about 6.8 to reduce swelling in said feed block. A dry meal flour is added to provide nutritional values to said feed block and to reduce the swelling of said feed block by reducing its temperature.

12 Claims, 1 Drawing Sheet

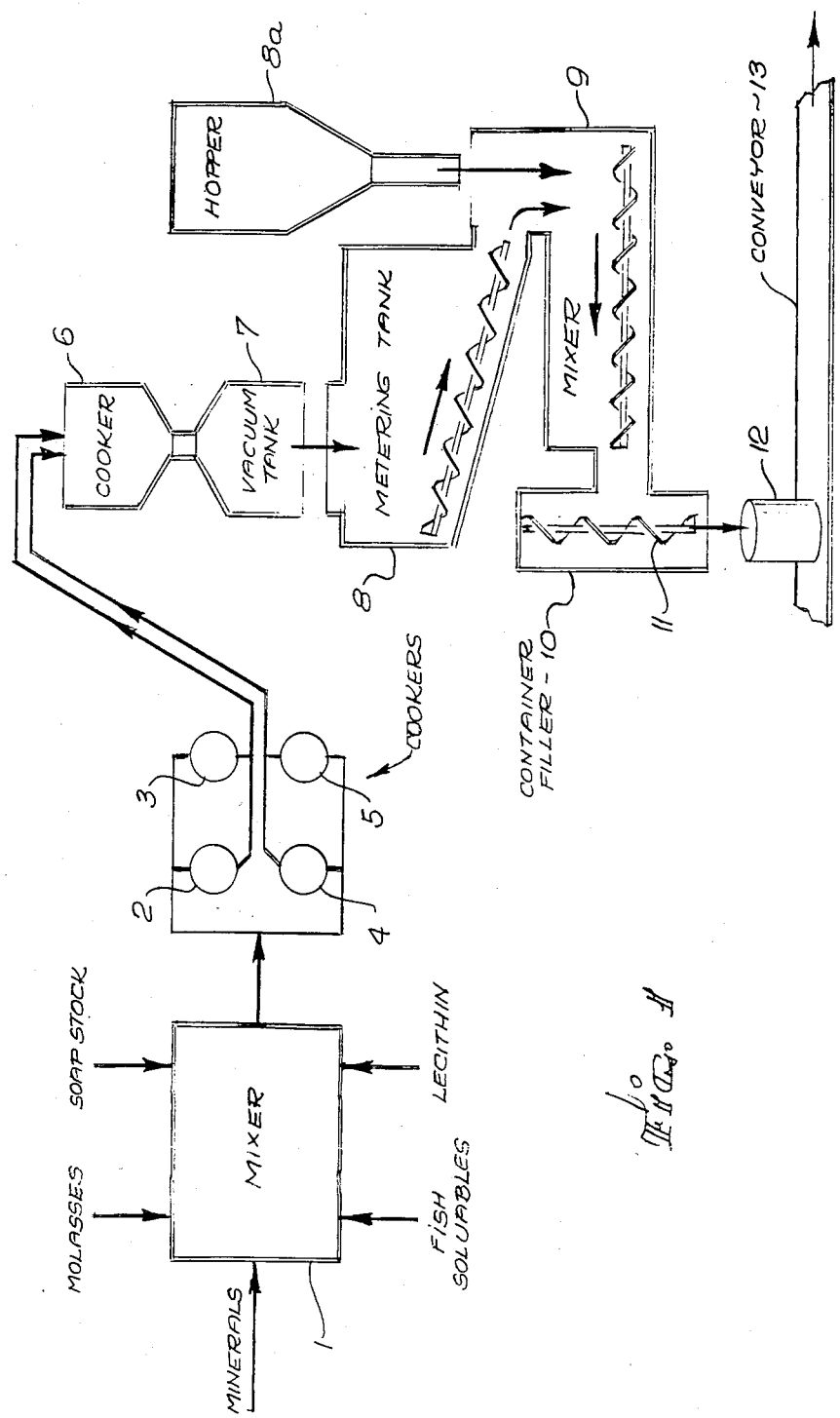

MOLASSES FEED BLOCK FOR ANIMALS AND METHOD OF MAKING THE SAME

BACKGROUND OF THE INVENTION

1. Field of the Invention

The field of the invention is high energy feed supplements used in the raising of cattle, horses, sheep, and other livestock animals. These feed supplements are generally made from molasses and other ingredients, and are generally manufactured in the form of either a liquid feed supplement, or a solid block type of feed supplement. The invention of the present application is directed towards an improved feed supplement in the form of a block.

2. Description of the Prior Art

The prior art relative to the present invention is best described in U.S. Pat. No. 3,961,081 issued to Carl O. McKenzie. The present invention is an improvement of the method and feed block disclosed in the McKenzie patent.

The McKenzie patent teaches a method of making a feed block which is said to be non-porous, hard and vitreous. The McKenzie patent provides a fluid feed composition comprised primarily of molasses and other ingredients, heating the fluid composition at ambient pressures and without substantial foaming to a temperature of from about 225° F. to about 300° F. to drive off water from the molasses mixture, subjecting the fluid composition to a vacuum without heating to further reduce the water content of the molasses mixture, forming the composition into feed blocks while the composition is sufficiently hot to be formable, and allowing the composition to cool until it hardens in the form of blocks.

Applicant, which is a licensee under the McKenzie patent, has found that the feed blocks produced by the McKenzie method are not as satisfactory as the McKenzie patent suggests. Applicant has found that feed blocks produced pursuant to the McKenzie patent tend to soften and become sticky and difficult to handle after the passage of time due to the absorption of atmospheric moisture. Applicant has also found that the McKenzie feed blocks tend to swell during their manufacture to produce a porous honeycombed structure. Swelling of the feed blocks enhances the ability of the blocks to absorb atmospheric moisture and causes packaging problems due to the increased volume of the block.

SUMMARY OF THE INVENTION

The instant invention solves the aforesaid problems of water absorption and swelling by providing an improved method and feed block which has a significantly reduced capacity for absorbing atmospheric moisture and which will not produce any significant swelling.

The water resistant, non-porous, hard, vitreous feed block of the present invention is generally made by the following method. A fluid feed composition is provided comprising molasses, about 1% to 2% by weight of unsaturated free fatty acids, and an amount of bivalent base sufficient to saponify said fatty acids into an insoluble soap to enhance the water resistance of the feed block. The fluid feed composition may also comprise a nutritionally compatible acid or base in an amount sufficient to maintain the pH of said composition between about 6.2 to about 6.8 to reduce the swelling of the feed block, and about 1% to about 2% by weight of lecithin to reduce the stickiness of the composition. All weight percents expressed herein are of the total fluid feed composition.

After the fluid feed composition has been thoroughly mixed, it is heated at ambient pressures to a temperature within a range from about 225° F. to about 300° F. to drive off most of the water content of the molasses and other ingredients. Thereafter, the fluid feed composition is subjected to a vacuum without any further heating to remove any additional water remaining in the fluid feed composition.

Following the vacuum step, about 18% to about 30% by weight of a dry meal flour is admixed with the hot fluid feed composition to provide additional nutritional values, and to reduce the swelling of the feed block by reducing its temperature. The feed composition is then formed into feed blocks and allowed to harden.

BRIEF DESCRIPTION OF THE DRAWINGS

The invention will be more specifically described in connection with the accompanying drawings in which:

FIG. 1 is a flow sheet of one embodiment of the present invention.

DESCRIPTION OF A PREFERRED EMBODIMENT

To prepare the improved feed block of the present invention, the individual ingredients thereof are first fed into a scale-mounted ribbon mixer depicted by the numeral 1 in FIG. 1, to form a fluid feed composition having a total weight of about 10,000 pounds. These ingredients, as expressed in weight percents of the total fluid feed composition mixture, comprise about 80% molasses, about 1-2% of free unsaturated fatty acids, about 1-2% of commercial grade lecithin, about 4% fish solubles, about 0.6% vitamin A, and about 10% of dry minerals to saponify the fatty acids and to adjust the pH of the mixture.

To prevent the dry minerals from adversely affecting the vitamin A, the fatty acids, lecithin, fish solubles and vitamin are added with the addition of the molasses. After about one quarter of the required molasses is added, then the dry minerals are added to the mixture. Molasses is continually added until total weight of the entire batch is reached. A steam jacket is provided around the mixture to maintain the temperature of the mix at about 200° F. to keep it in a fluid condition. The ribbon mixer thoroughly mixes the ingredients and provides an even distribution thereof. The pressure of the steam in the jacket is maintained between 40 to 50 psig.

The free fatty acids are preferably added as part of an acidulated soap stock, having a pH of 4 to 4.5, which is obtained from cottonseed oil or soybean oil which contains about 70–80% unsaturated free fatty acids, 5% of water, and 20–30% of triglycerides. Soap stocks from soybean or cottonseed oil are preferred only because they are readily available and least expensive. Acidulated soap stocks from any other vegetable or mineral oil containing large amounts of unsaturated free fatty acids may be employed.

The 1–2% commercial lecithin added to the fluid feed composition contains 60–70% pure lecithin, and 30–40% of unsaturated fatty acids. The unsaturated fatty acids from the commercial lecithin when combined with the unsaturated fatty acids from the acidulated soap stock will provide a total of about 1–2% of unsaturated free fatty acids for the entire mixture.

The dry minerals comprise a bivalent base or bases in an amount sufficient to saponify the free fatty acids to an insoluble soap, a base or mixture of bases to regulate the pH of the mixture, and anhydrous salts to form a crystaline complex with any water remaining in the mixture after vacuum distillation.

The bivalent bases used for saponification comprise hydrated lime (calcium hydroxide) limestone flour (calcium carbonate), magnesium oxide, and zinc oxide. It has been found that the use of saturated fats or oils, or the use of saponification agents containing monovalent cations will not produce insoluble soaps and will result in a feed block that will absorb atmospheric moisture and soften with time.

As an alternative to adding free fatty acids and saponifying agents to react and form insoluble soaps, these reactants may be eliminated and insoluble soaps may be added directly to the fluid feed composition.

If the fluid feed composition is made from a molasses having an acidic pH, such as high brix cane molasses having a pH of 5 to 5.5, the pH of the composition is adjusted to the desired range of 6.2 to 6.8 by the addition of a base. The bases used for that purpose may be calcium hydroxide (hydrated lime), sodium hydroxide, magnesium hydroxide, ammonium hydroxide, or any other base that is nutritionally compatible with the feed composition and that will not injure animals feeding from it.

If the fluid feed composition is made from a molasses having an alkaline pH, such as beet molasses having a pH over 7, the pH is adjusted by the addition of an acid. The preferred acid for this purpose is phosphoric acid because of its nutritional value, but other acids, such as hydrochloric or sulfuric may be utilized.

The anhydrous salts are added in amounts between about 0.5% to about 3% and comprise sodium sulfate, magnesium sulfate, calcium chloride, and any other anhydrous salt which is nutritionally compatible with the feed block.

Fish solids, urea, and sodium selenite are added to the fluid feed composition to provide additional nutrients.

After the aforesaid ingredients have been added and mixed in the ribbon mixer, they are pumped out into four primary cookers depicted by numerals 2 to 5 in FIG. 1, each having a capacity of 2,000 lbs. Each cooker is provided with a steam jacket regulated at 100 psig of steam for maintaining the temperature of the mixture therein from about 225° F. to about 300° F., and preferably between 240° F. to 250° F., at ambient pressure. A scraper and mixer is provided in each cooker to ensure that the feed composition is thoroughly mixed and cooked. The feed composition is cooked in each of the primary cookers for about 45 minutes to boil off water contained in the molasses and other ingredients used to form the fluid feed composition. The steam in the steam jacket is turned off and on at 15 minute intervals to maintain the desired temperature range.

After cooking, the fluid feed composition is pumped from one of the cookers into a secondary cooker 6 which is connected to a vacuum tank 7. The fluid feed is cooked again in cooker 6 for about 5 to 10 minutes at a temperature of about 244° F. to about 265° F., to drive off any remaining water, and is then discharged into a vacuum tank 7 of the type described in U.S. Pat. No. 3,961,081, to remove additional water by vacuum distillation. The vacuum is run at 24 inches of mercury for about 10 to 12 minutes. The vacuum tank is provided with a steam jacket that is maintained at about 25 psig of steam, and the composition cools to about 180° F. to about 185° F. as it enters the vacuum tank.

The feed composition is then discharged into a metering tank 8 having a sloped floor and a screw conveyor for moving the composition into a mixing tank 9. The metering tank is provided with a steam jacket maintained at 25 psig of steam, and the composition cools further to about 178° F.

As the hot composition flows from the metering tank 8 it is admixed with a dry meal, from hopper 8a, in an amount which will comprise about 18% to about 30% by weight of the total feed composition. The dry meal is prepared from cottonseeds, soybeans, or any other dry meal used as livestock feed, and is ground to a flour-like consistency.

The introduction of the meal, which is at ambient temperatures, causes an immediate drop in the temperature of the hot fluid feed composition to about 150° F. This drop in temperature decreases the evolution of gases from the fluid feed composition which would otherwise result in swelling and a porous honeycombed product as the feed composition is later formed into solid blocks.

The fluid feed composition and the dry meal are blended and mixed together in mixer 9 by a twink screw mixer which conveys the feed composition to a container filler 10 having a vertical screw 11. The feed composition is then discharged from the container filler 10 with the aid of the vertical screw 11 and flows into a drum container 12 which is moved away by means of a conveyor 13 for cooling and storage.

The above description traces a flow of one batch of feed composition from one of the primary cookers 2,3,4 or 5 to the secondary cooker 6. When that batch is discharged from the secondary cooker 6, the next batch from one of the other primary cookers is ready to be pumped into the secondary cooker 6. This process is repeated until each batch from the primary cookers is pumped into the secondary cooker 6 and processed as described hereinabove.

The feed block produced by the aforesaid method is found to be water resistant, non-porous, hard and vitreous and does not experience any significant amount of swelling. The insoluble soaps produced from the saponfication of the 1-2% of unsaturated free fatty acids is believed to significantly improve the resistance to moisture of the feed block. Greater amounts of free fatty acids may provide for even more water proofing, but it has been found that if the fatty acid content is above 4-5%, the surface tension of the hot composition increases to a degree where it becomes difficult to mix in the dry meal.

It has further been discovered that insoluble soaps which provide waterproofing for the finished feed block will allow the outer surface of the feed block to absorb atmospheric moisture at a relatively slow rate so that the outer surface softens at a relatively slow rate. However, the feed block underneath the surface layer continues to resist moisture penetration and thereby avoids becoming a soft runny sticky mass which is a characteristic of feed blocks made pursuant to said McKenzie patent.

In adding calcium hydroxide (hydrated lime) to saponify the free fatty acids, it is noted that only about 165 lbs of calcium hydroxide per 10,000 lbs of total composition may be added because greater concentrations causes the mixture to fume and bubble.

It is desired to reduce the calcium level, a stronger base such as sodium hydroxide buffered with ammonium phosphate may be used to maintain the pH at its proper level. This has the advantage of introducing more phosphates which is a desirable feed supplement.

It has been found that the addition of the dry meal to the composition will lower its temperature and reduce the evolution of gases therefrom which produces swelling. It has also been found, that regulating the pH of the composition from about 6.2 to about 6.8 will also decrease the evolution of gases from the hot composition and reduce swelling. Using both these techniques in combination, i.e. the addition of dry meal plus regulating pH, will provide a maximum amount of control over swelling. A pH under about 6 has been found to make the composition unstable and allow for swelling.

Cooking the feed composition in the primary and secondary cookers and subjecting it to vacuum distillation will remove about 2,000 lbs of water per 10,000 lbs of feed composition. However, there will still remain a certain degree of water which will not be removed and which, if allowed to remain in the feed composition, would hasten its softening when prepared in block form. It has been found that the addition of anhydrous salts will remove these remaining traces of water by forming crystalline complexes with the salts.

Anhydrous salts may also be used as a means for reducing some of the energy required for heating and vacuum distillation. If the fluid feed composition is not cooked as long or at the high temperatures provided for herein, and if it is not subjected to the high vacuum distillation of the vacuum tank 7, more water will be retained in the fluid feed composition. However, the presence of high levels of anhydrous salts will compensate for the greater quantities of water left remaining in the composition by tying up this free water and making it unavailable to soften the final product.

The anhydrous salt that appears to perform most satisfactorily is magnesium sulfate heptahydrate which is added between 0.5-1.0 weight percent of the total mix. The heptahydrate portion of the magnesium sulfate is lost during cooking, thus leaving the anhydrous magnesium sulfate in a position to react with any free water in the composition. Sodium sulfate (salt cake), has also been found to work well, but it does not produce a feed block that is as hard as feed blocks made with magnesium sulfate.

The foregoing process has been described in terms of four primary batch cookers which pump the fluid feed composition into a secondary cooker. However, this is not a limitation to the invention because the process can be worked so that the feed composition from the mixture 1 can be pumped directly into a single cooker, and from there into a vacuum tank.

The following are examples of feed compositions of the present invention.

EXAMPLE 1

| | Pounds | |
|---|---|---|
| Acidulated Soybean Soap stock | 142 | |
| Acidulated Fish solubles | 424 | |
| Lecithin (commercial grade) | 155 | |
| Vitamin A Palmitate (80,000,000 i.u. number) | 6 | |
| Molasses | 8377 | |
| Limestone flour-$CaCO_3$ | 100 | |
| Dicalcium phosphate $Ca_2 PO_4$ | 150 | |
| Hydrated Lime - $Ca(OH)_2$ | 165 | |
| Urea | 525 | |
| Copper Sulfate - $CaSO_4$ | 6 | |
| Zinc Sulfate - $ZnSO_4$ | 37 | |
| Sodium Selenite Solution | 5 | grams |
| | 10,087 | |
| water loss | 2,065 | |
| | 8,022 | |
| Cottonseed meal | 2,674 | |
| | 10,696 | |

EXAMPLE 2

| | Pounds |
|---|---|
| Acidulated Soybean Soap stock | 250 |
| Lecithin (commercial grade) | 120 |
| Vitamin A Palmitate (80,000,000 i.u. number) | 3.4 |
| Molasses | 9407 |
| Magnesium Oxide - MgO | 130 |
| Phosphoric Acid $H_2PO_4$ | 90 |
| Magnesium Oxide (MgO) | 163 |
| Dolomite | 1237 |
| Bakery wastes | 1232 |
| | 10,525 |

In the above example, magnesium oxide, dolomite, and bakery wastes which refers to waste products from the bakery industry, are added in dry, flour form and in substitution for dry meal at the same point in the process where dry meal is added.

EXAMPLE 3—for Cows and Calves

| | Pounds | |
|---|---|---|
| Acidulated Soybean Soap stock | 142 | |
| Acidulated Fish solubles | 424 | |
| Lecithin (commercial grade) | 155 | |
| Vitamin A Palmitate (80,000,000 i.u. number) | 12 | |
| Molasses | 7893 | |
| Limestone flour-$CaCO_3$ | 100 | |
| Dicalcium phosphate $Ca_2 PO_4$ | 538 | |
| Hydrated Lime - $Ca(OH)_2$ | 165 | |
| Copper Sulfate - $CaSO_4$ | 6 | |
| Zinc Sulfate - $ZnSO_4$ | 37 | |
| Sodium Selenite Solution | 5 | grams |
| Cottonseed meal (after water loss) | 2674 | |
| | 10,696 | |

EXAMPLE 4—for Horses

| | Pounds | |
|---|---|---|
| Acidulated Soybean Soap stock | 142 | |
| Acidulated Fish solubles | 424 | |
| Lecithin (commercial grade) | 142 | |
| Vitamin A Palmitate (80,000,000 i.u. number) | 12 | |
| Molasses | 8822 | |
| Limestone flour-$CaCO_3$ | 100 | |
| Dicalcium phosphate $Ca_2 PO_4$ | 150 | |
| Hydrated Lime - $Ca(OH)_2$ | 165 | |
| Copper Sulfate - $CaSO_4$ | 6 | |
| Zinc Sulfate - $ZnSO_4$ | 37 | |
| Sodium Selenite Solution | 5 | grams |
| Cottonseed meal(after water loss) | 10,449 | |

EXAMPLE 5—for Heifers

|  | Pounds |  |
|---|---|---|
| Acidulated Soybean Soap stock | 140 |  |
| Acidulated Fish solubles | 424 |  |
| Lecithin (commercial grade) | 153 |  |
| Vitamin A Palmitate (80,000,000 i.u. number) | 6 |  |
| Molasses | 8224 |  |
| Limestone flour-CaCO$_3$ | 35 |  |
| Dicalcium phosphate Ca$_2$ PO$_4$ | 284 |  |
| Hydrated Lime - Ca(OH)$_2$ | 165 |  |
| Urea | 526 |  |
| Copper Sulfate - CaSO$_4$ | 6 |  |
| Zinc Sulfate - ZnSO$_4$ | 37 |  |
| Sodium Selenite Solution | 5 | grams |
| Cottonseed meal(after water loss) | 2674 |  |
|  | 10,625 |  |

I claim:

1. The method of making a water resistant, non-porous, hard, vitreous feed block for animals comprising the steps of:
   providing a fluid feed composition comprising molasses, and
      about 1% to about 2% by weight of an insoluble soap to enhance the water resistance of said feed block,
   heating said fluid composition at substantially ambient pressure and without substantial foaming in the composition to a temperature within a range of from about 225° F. to about 300° F. so as to drive off the major portion of the water content of the molasses in the composition,
   subjecting substantially all portions of said heated, fluid composition to a substantial vacuum without substantial further temperature increase so as to further substantially reduce the water content of the fluid feed composition,
   forming said composition into blocks while it is still sufficiently hot to be formable, and allowing the composition to cool until it hardens into formed blocks.

2. The method as set forth in claim 1 wherein said insoluble soap is formed in said fluid feed composition by admixing therein, about 1% to about 2% by weight of unsaturated free fatty acids, and an amount of a bivalent base or mixture thereof, to saponify said fatty acids into an insoluble soap.

3. The method as set forth in claim 1 wherein said fluid feed composition further comprises a nutritionally compatible base or acid in amounts sufficient to maintain the pH of said composition between about 6.2 to about 6.8 to reduce the swelling of said feed block.

4. The method as set forth in claim 3 wherein an amount a dry meal flour is admixed with said fluid feed composition following the vacuum distillation to reduce swelling of said feed block by reducing its temperature, said amount comprising about 18% to about 30% of said feed block.

5. The method as set forth in claim 4 wherein said fluid feed composition further comprises about 0.5% to about 3% by weight of an anhydrous salt to further reduce the water content of said feed block by forming a crystalline complex with any water remaining in said composition after vacuum distillation.

6. The method as set forth in claim 5 wherein said fluid feed composition further comprises about 1% to about 2% by weight of lecithin to reduce the stickiness of said composition.

7. The method of making a water resistant non-porous, hard, vitreous feed block for animals comprising the steps of:
   providing a fluid feed composition comprising molasses,
      about 1% to about 2% by weight of unsaturated free fatty acids,
      an amount of bivalent metallic base sufficient to saponify said fatty acids into an insoluble soap to enhance the water resistance of said feed block,
      about 1% to about 2% by weight of lecithin to reduce stickiness of said composition,
      a nutritionally compatible base or acid in amounts sufficient to maintain the pH of said composition between about 6.2 to about 6.8 to reduce the swelling of said feed block,
      about 0.5% to about 3% by weight of an anhydrous salt to further reduce the water content of said feed block by forming a crystalline complex with any water remaining in said composition after vacuum distillation,
   heating said fluid composition at substantially ambient pressure and without substantial foaming in the composition to a temperature within a range of from about 225° F. to about 300° F. so as to drive off the major portion of the water content of said composition,
   subjecting substantially all portions of said heated, fluid composition to a substantial vacuum without substantial further temperature increase so as to further substantiall reduce the water content of said composition,
   admixing an amount of a dry meal flour to add nutritional values to said feed block and to reduce swelling of said feed block by reducing its temperature, said amount comprising about 18% to about 30% of said feed block,
   forming said composition into blocks while it is still sufficiently hot to be formable,
   and allowing the composition to cool until it hardens into formed blocks.

8. A water resistant, non-porous, hard, vitreous feed block for animals comprising molasses and about 1% to about 2% by weight of an insoluble soap wherein the feed block has a pH of from about 6.2 to about 6.8.

9. A feed block as set forth in claim 8 further comprising about 18% to about 30% of a dry meal flour.

10. A feed block as set forth in claim 9 further comprising about 0.5% to about 3% by weight of an anhydrous salt.

11. A feed block as set forth in claim 10 further comprising about 1% to about 2% by weight of commercial grade lecithin.

12. A water resistant, non-porous, hard, vitreous feed block for animals comprising:
   molasses,
   about 1% to about 2% by weight of an insoluble soap,
   about 1% to about 2% by weight of commercial grade lecithin,
   about 0.5% to about 3.5% by weight of an anhydrous salt,
   about 18% to about 30% by weight of a dry meal flour, and
   a pH of between about 6.2 to about 6.8.

* * * * *

UNITED STATES PATENT AND TRADEMARK OFFICE
CERTIFICATE OF CORRECTION

PATENT NO. : 4,749,578
DATED : June 7, 1988
INVENTOR(S) : Alfred E. Benton; John R. Patrick It is certified that error appears in the above-identified patent and that said Letters Patent is hereby corrected as shown below:

On the Front Page

Inventors: "John Patrick" should be - - John R. Patrick - -

Assignee: "Benton Fee Yard" should be - - Benton Feed Yard, Inc.--.

| | |
|---|---|
| Column 2, Line 3 | Change "thorough" to — thoroughly — |
| Column 2, Line 41 | After "vitamin" insert — A — |
| Column 3, Line 4 | Before "anhydrous" change "and" to — an — |
| Column 3, Line 5 | Before "complex" change "crystaline" to — crystalline — |
| Column 3, Line 20 | Change "brix" to — Brix — |
| Column 4, Line 68 | Before "the" change "causes" to — cause — |
| Column 5, Line 13 | After "i.e." and before "the" add — , — |
| Column 7, Line 56 | After "amount" delete "a" and substitute — of — |
| Column 8, Line 11 | Change "soaponify" to — saponify — |
| Column 8, Line 34 | Change "substantiall" to — substantially — |

Signed and Sealed this

Seventh Day of February, 1989

Attest:

DONALD J. QUIGG

*Attesting Officer*  *Commissioner of Patents and Trademarks*